United States Patent
Varnosfaderani et al.

(10) Patent No.: US 12,444,841 B2
(45) Date of Patent: Oct. 14, 2025

(54) NFC-BASED DISTANCE DETERMINATION

(71) Applicant: NXP B.V., Eindhoven (NL)

(72) Inventors: Pouyan Ebrahimbabaie Varnosfaderani, Graz (AT); Johannes Stahl, Graz (AT); Ulrich Andreas Muehlmann, Graz (AT)

(73) Assignee: NXP B.V., Eindhoven (NL)

( * ) Notice: Subject to any disclaimer, the term of this patent is extended or adjusted under 35 U.S.C. 154(b) by 243 days.

(21) Appl. No.: 18/144,188

(22) Filed: May 6, 2023

(65) Prior Publication Data

US 2024/0372258 A1    Nov. 7, 2024

(51) Int. Cl.
*H01Q 7/00* (2006.01)
*H01Q 1/22* (2006.01)

(52) U.S. Cl.
CPC ............ *H01Q 7/00* (2013.01); *H01Q 1/2208* (2013.01)

(58) Field of Classification Search
CPC .... G06K 7/00; G06K 7/10237; H01Q 1/2208; H01Q 7/00; H04W 4/80
See application file for complete search history.

(56) References Cited

U.S. PATENT DOCUMENTS

| | | | |
|---|---|---|---|
| 10,095,688 B1* | 10/2018 | Schilling | H04L 51/06 |
| 10,749,575 B2 | 8/2020 | Ricard et al. | |
| 11,182,770 B1* | 11/2021 | Yan | H04B 5/72 |
| 11,848,725 B2 | 12/2023 | Stahl et al. | |
| 2013/0041775 A1* | 2/2013 | Rosenberg | H04B 5/77 |
| | | | 705/26.1 |
| 2014/0127993 A1* | 5/2014 | Frankland | G06K 19/0726 |
| | | | 455/41.1 |
| 2016/0083978 A1* | 3/2016 | Dayanikli | E05B 47/0012 |
| | | | 70/85 |
| 2017/0280288 A1* | 9/2017 | Do | H04W 4/023 |
| 2018/0157259 A1* | 6/2018 | Myslinski | G05D 1/0094 |
| 2019/0140892 A1* | 5/2019 | Jain | H04L 41/16 |
| 2019/0191266 A1* | 6/2019 | Wang | B60K 35/60 |
| 2019/0191267 A1* | 6/2019 | Wang | H04W 84/18 |
| 2022/0025683 A1* | 1/2022 | Becher | E05F 1/10 |
| 2022/0123785 A1 | 4/2022 | Stahl et al. | |
| 2022/0231728 A1 | 7/2022 | Wobak et al. | |

* cited by examiner

Primary Examiner — Thien M Le

(57) ABSTRACT

A device may include a data storage device storing a first look-up table that contains a plurality of distance mappings that each associate a value of a first signal feature with a distance value. An NFC reader is configured to communicate with an NFC tag includes: an antenna, a transmitter that is configured to use the antenna to transmit a radio frequency transmitted field, a receiver configured to receive from the antenna one or more response signals in response to the radio frequency transmitted field transmitted by the transmitter, and a signal processor configured to: process the one or more response signals to determine a first value of the first signal feature, access the first look-up table to determine a first distance mapping that associates the value of the first signal feature with a first distance, and generate an output signal based upon the first distance.

17 Claims, 11 Drawing Sheets

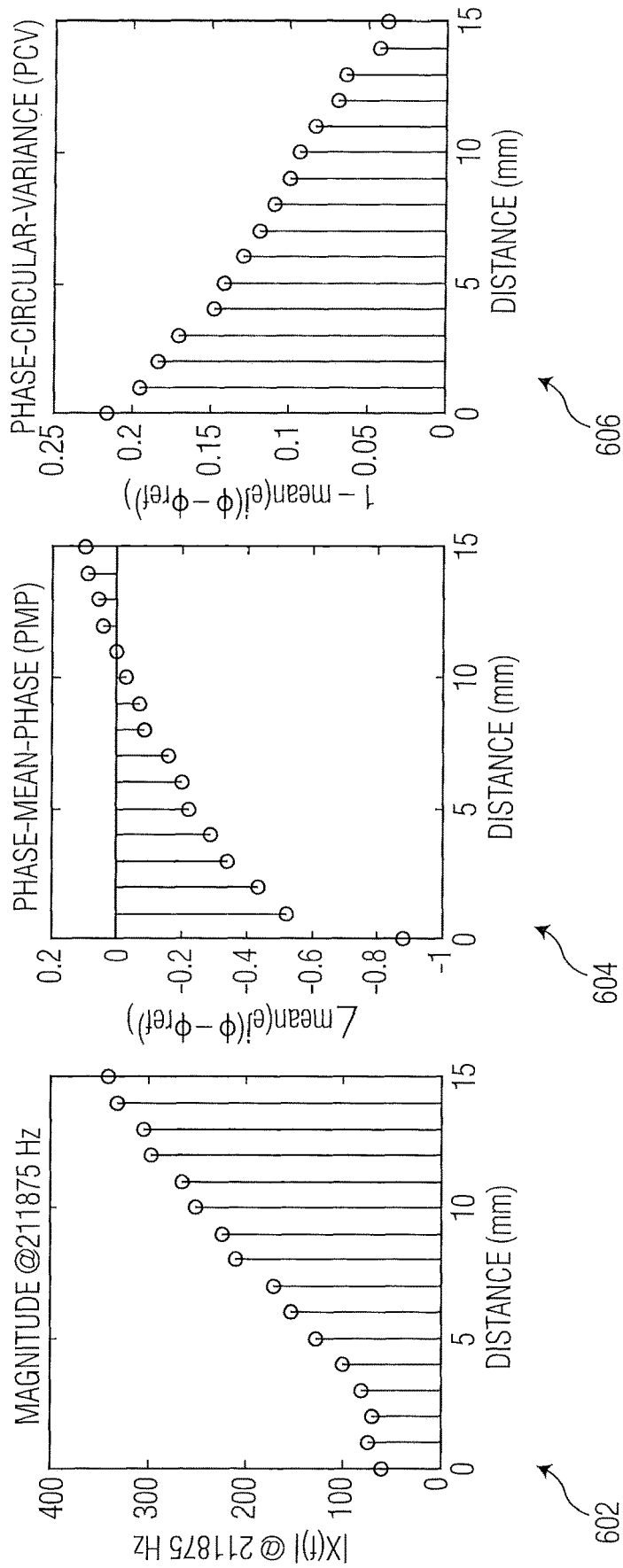

NFC-BASED DISTANCE DETERMINATION

TECHNICAL FIELD

The present disclosure relates to approaches for determining distance using a near-field communication (NFC) reader and, more particularly, to approaches for processing radio frequency (RF)-off ringing signals received by an NFC reader from an NFC tag or other metallic object to determine a distance between the NFC reader and the NFC tag or other metallic object.

BACKGROUND

Radio frequency (RF) communication devices are widely used. Examples of RF communication devices are near-field communication (NFC) devices and radio frequency identification (RFID) devices. Typically, an NFC system or an RFID system includes a reader device—sometimes referred to as a reader, an interrogator or a proximity coupling device (PCD)—which generates a high-frequency radio field, and a passive or active communication counterpart. The communication counterpart may be a passive transponder or an active card device, for example, which may be referred to as a proximity integrated circuit card (PICC) or NFC tag. The reader device emits a radio frequency field that may power the communication counterpart. Modulation schemes and signal coding are applied for the communication between the devices. Specific implementation examples are described, inter alia, in the technical standards issued by the NFC Forum, and in the technical standards ISO/IEC 14443, ISO/IEC 15693, ISO/IEC 18092.

In this manner, NFC readers and their corresponding NFC tags can communicate using low-power RF transmissions. NFC readers and tag are typically low-cost hardware solutions enabling their deployment as low-cost communication systems for a number of different applications.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIGS. 6A-6C depict graphs illustrating the relationship between a specific feature of the measured RF-off ringing signal and a corresponding distance value.

DETAILED DESCRIPTION

The following detailed description is merely illustrative in nature and is not intended to limit the embodiments of the subject matter of the application and uses of such embodiments. As used herein, the words "exemplary" and "example" mean "serving as an example, instance, or illustration." Any implementation or embodiment described herein as exemplary or an example is not necessarily to be construed as preferred or advantageous over other implementations. Furthermore, there is no intention to be bound by any expressed or implied theory presented in the preceding technical field, background, or the following detailed description.

Radio frequency (RF) communication devices are widely used. Examples of RF communication devices are near-field communication (NFC) devices and radio frequency identification (RFID) devices. In this disclosure, references to an NFC device or an NFC reader should be understood to include RFID devices and readers. Typically, an NFC system or an RFID system includes a reader device—sometimes referred to as a reader, an interrogator or a proximity coupling device (PCD)—which generates a high-frequency radio field, and a passive or active communication counterpart. The communication counterpart may be a passive transponder (also referred to as an NFC tag) or an active card emulation device, for example, which may be referred to as a proximity integrated circuit card (PICC). The reader device emits a radio frequency field that may power the communication counterpart. Modulation schemes and signal coding are applied for the communication between the devices. Specific implementation examples are described, inter alia, in the technical standards issued by the NFC Forum, and in the technical standards ISO/IEC 14443, ISO/IEC 15693, ISO/IEC 18092.

Figure 1:
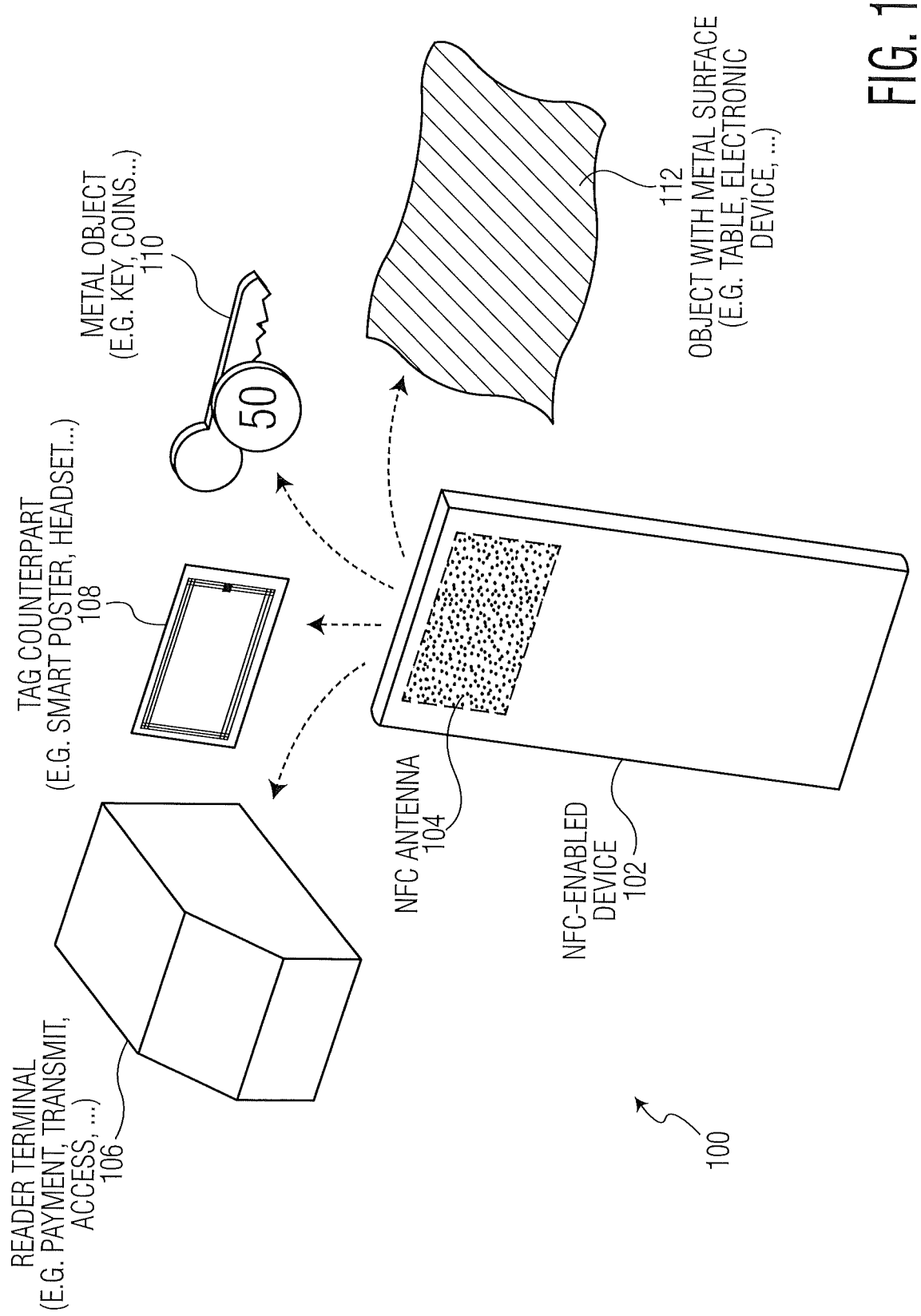
FIG. 1 shows an example of a near-field communication (NFC) system.

FIG. 1 shows an example of a near-field communication (NFC) system 100. The system 100 comprises an NFC-enabled device 102, which is configured to establish near-field communication with other NFC-enabled devices or tags. An example of such other NFC-enabled device is reader terminal 106, which may be used for payment applications, public transit applications, access applications and other applications. Another example of such other NFC-enabled device is NFC tag counterpart 108. An NFC tag is typically a passive device, which may be integrated into a smart poster, a headset or another object or product. The NFC-enabled device 102 contains an NFC antenna 104, which may be coupled inductively to the antennas (not shown) of the other NFC-enabled devices. However, in addition to these NFC-enabled devices, also other objects may be in close proximity of the NFC-enabled device 102, thus entering the RF field emitted by the NFC-enabled device 102. Examples of such objects are metal objects 110, such as keys and coins, and objects 112 having a metal surface, such as tables and electronic devices. These other objects may negatively affect the performance of the NFC-enabled device 102.

In typical applications, the operation of system 100 is focused on providing contactless communication between two electronic devices (e.g., NFC-enabled device 102 and reader terminal 106) over a short-range distance (typically <10 centimeters (cm)). To date, NFC technology is used mainly in contactless payment, fare collection, and car access systems using, e.g., cards or smartphones, NFC functionality.

In the present disclosure, an NFC system implementation is provided in which an NFC reader device (e.g., reader terminal 106 of FIG. 1) is configured to interact with a passive NFC tag (e.g., NFC tag counterpart 108) to determine a distance between the reader and the tag. While determining that measurement information, the present NFC system may be used, substantially simultaneously, to implement conventional NFC wireless communication activities, such as to enable substantially real-time distance measurement and NFC tag authentication. The described embodiments of NFC system functionality broadens the applications of NFC technology.

In various embodiments, the present system provides a new NFC-based technology that enables relatively high-resolution (e.g., at resolution of around the millimeter level or better) and relatively low-power measurement of distance between an NFC reader and an NFC tag. Various methods of using the system enable measurement of NFC tag proximity, object thickness, and a liquid level in a non-conductive holding tank, as described herein.

In some NFC system implementations, NFC readers are configured to accurately detect NFC counterparts of interest (COI), e.g., an NFC tag or other NFC-enabled device, as a means of ensuring communications are occurring with a true NFC COI, rather than a false NFC counterparts (e.g., RF-reflective metal objects, such as keys or coins). One approach for distinguishing true NFC COIs from false COIs is to analyze the ringing signals induced in the receiver of the NFC-reader device after the RF field transmitted by the NFC reader has been switched off. These signals are referred to as RF-off ringing signals.

As described in the present disclosure, such RF-off ringing signals can be received, processed, and analyzed, to determine certain characteristic that may be analyzed to further determine a distance between the NFC reader that originally generated the RF transmitted field and the object that emitted the corresponding RF-off ringing signal. As described herein, that distance value, once determined, can be used to enable the NFC system to measure various attributes (e.g., distance, thickness, depth) of real-world objects in a low-cost, low-power manner.

In a specific implementation, as described herein, the RF-off ringing signals are processed to determine values of a number of features of the received RF-off ringing signals. Those signal feature values can then be mapped to particular distance values.

Figure 2:
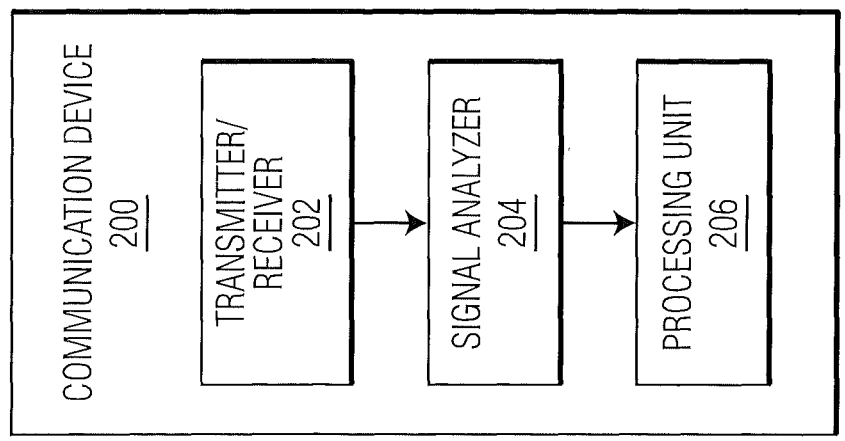
FIG. 2 shows an illustrative embodiment of a communication device, such as an NFC reader, that may be used to implement the present NFC-based distance measurement system.

FIG. 2 shows an illustrative embodiment of a communication device 200, such as an NFC reader that may be used to implement the present NFC-based distance measurement system. Communication device 200 comprises transceiver 202, which includes a transmitter part and a receiver part, signal analyzer 204 and processing unit 206. The transmitter of transceiver 202 is configured to transmit or otherwise emit one or more radio frequency (RF) signal pulses or RF transmitted fields that are configured to interact with an NFC tag or other NFC-enabled device. The receiver of transceiver 202 is configured to receive one or more response signals in response to the radio frequency signal pulses transmitted by the transmitter of transceiver 202. As described herein, the one or more response signals may include RF-off ringing signals that may be emitted by an NFC tag that is nearby communication device 200.

Signal analyzer 204 of communication device 200 is configured to process the one or more response signals to determine values of various features thereof. Such signal features may include absolute values of magnitudes of a frequency-domain version of the received signal, a phase-mean-phase (PMP value of the response signals, and a phase-circular-variance (PCV) of the response signals, and the like.

Processing unit 206 is configured to process the values of the various signal features generated by signal analyzer 204 to determine a distance between communication device 200 and the remote NFC tag that generated the response signals. This may involve mapping the signal feature values to particular distance values as found in a look-up table or other data repository. In some embodiments, this may involve the signal analyzer 204 performing interpolation to determine an appropriate distance value when the signal feature values fall between those stored in the look-up table. Based on the determined distance value, processing unit 206 can generate various output messages or signals that can be indicative of that determined distance value.

In some cases, processing unit 206 may be further configured to compare the determined distance values to various threshold values and generate specific output signals based upon that comparison. For example, when communication device 200 is incorporated into a door frame with an NFC tag being incorporated onto the corresponding door, or vice versa, the distance may be indicative of whether the door is open or closed. As such, if the determined distance is greater than a threshold value, that may indicate the door is open and processing unit 206 can generate appropriate output messaging alerting a user as to the open status of the door.

In embodiments, signal analyzer 204 may be further configured to determine a type or configuration of the device (e.g., an NFC tag) that generated the response signals. The NFC tag configuration, once determined, may be used by processing unit 206 when mapping the signal feature values to determine a distance value based upon that specific NFC tag configuration.

In one or more embodiments, processing unit 206 is further configured to perform at least one of the following NFC operations: send a polling command to the NFC tag or NFC-enabled device, start a communication session with the NFC tag or NFC-enabled device, configure one or more parameters of the transmitter of transceiver 202, and configure one or more parameters of the receiver of transceiver 202.

In practical implementations, signal analyzer 204 comprises a classifier configured to process the response signals. By using a classifier, the analysis of the response signal can be carried out reliably and efficiently.

Figure 3:
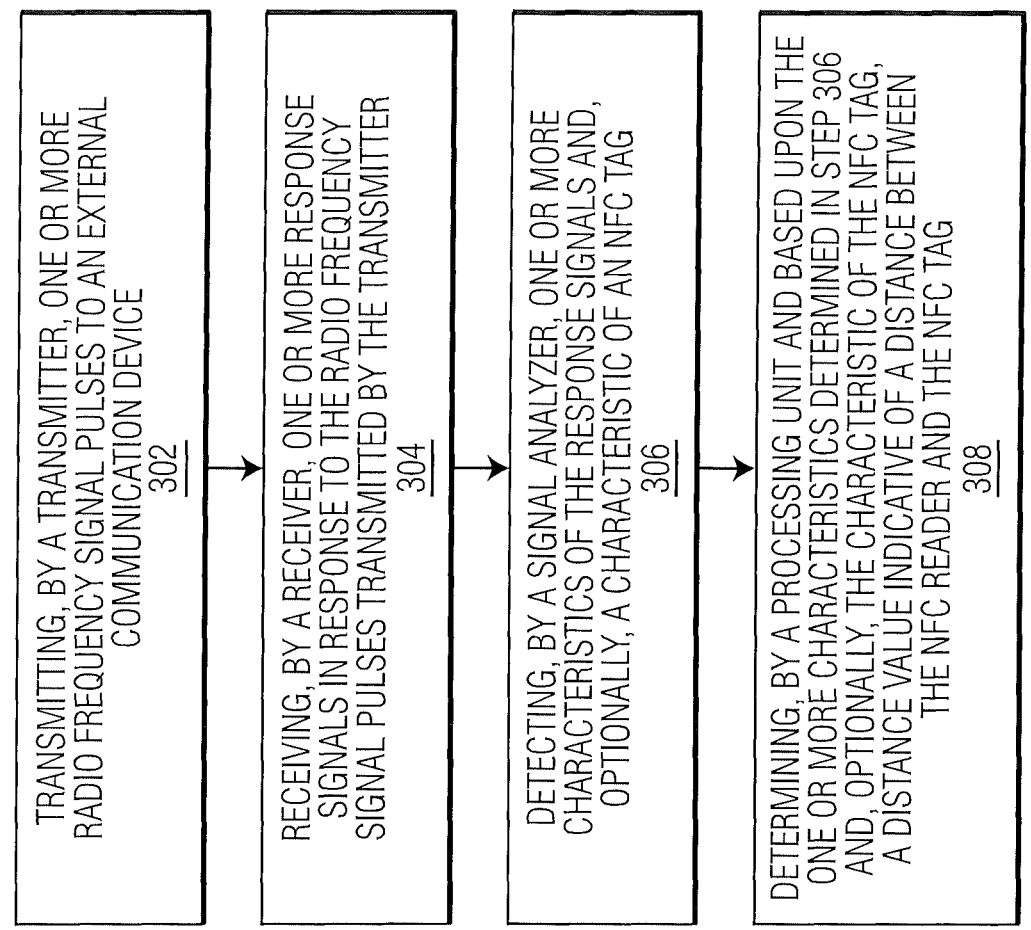
FIG. 3 shows an illustrative embodiment of a method of operating a communication device, such as an NFC reader.

FIG. 3 shows an illustrative embodiment of a method 300 of operating a communication device, such as an NFC reader (e.g., communication device 200 of FIG. 2). In step 302, a transmitter of an NFC reader is configured to transmit or emit an RF transmitted field. The field is configured to be received by an NFC tag (or other NFC-enabled device) that is in proximity to the NFC reader.

In step 304, a receiver of the NFC reader receives one or more response signals in response to the RF transmitted field generated by the transmitter. As described above, the response signals generally comprise RF-off ringing signals that are emitted by a nearby NFC tag or other object immediately after the radio frequency signal pulses transmitted by the transmitter have been turned off.

In step 306, a signal analyzer in the NFC reader determines values of one or more features of the response signals. This step may further involve, optionally, the determination of a configuration of the NFC tag itself, such as a model number, serial number, or some other value that may be indicative of the configuration of the NFC tag. In step 308, a processing unit analyses the feature values of the response signals (e.g., via comparison to values stored in a look-up table) to determine a corresponding distance value. In embodiments in which the configuration of the NFC tag is determined in step 306, step 308 may further include determining a particular look-up table out of a plurality of look-up tables that stores response signal feature values to distance mappings for that particular configuration of NFC tag and then using that look-up table to complete step 306. The processing unit then generates an output signal indicative of the distance value, which reflects a distance between the NFC reader and the NFC tag.

Figure 4:
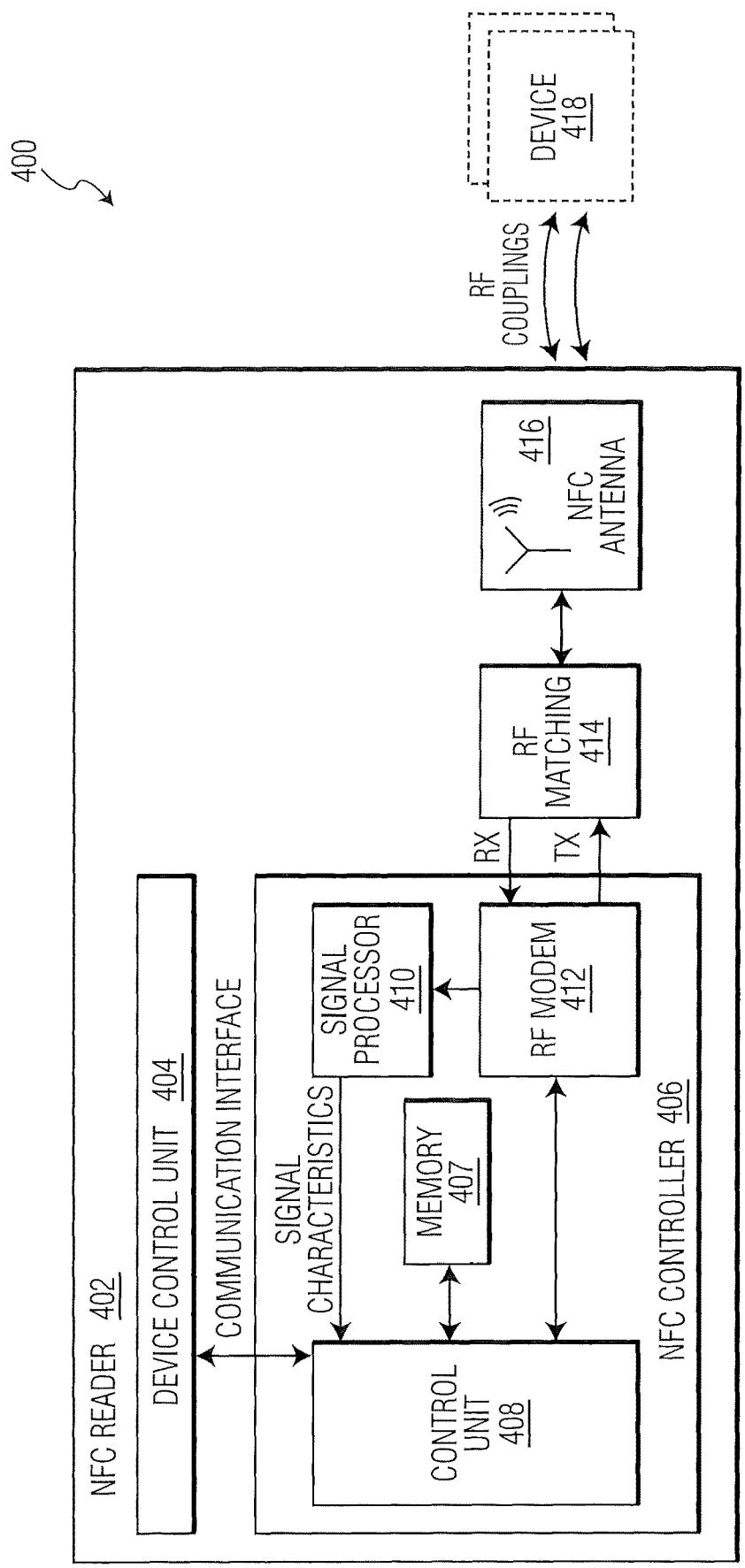
FIG. 4 shows an illustrative embodiment of an NFC system configured in accordance with the present disclosure.

FIG. 4 shows an illustrative embodiment of an NFC system 400 configured in accordance with the present disclosure. The system 400 includes an NFC reader 402 which is configured to process response signals (e.g., RF-off ringing signals) received from device 418, which may include an NFC tag and that is external to the NFC reader 402.

In some instances, a communicative coupling may be established between the NFC reader 402 and device 418. The NFC reader 402 includes a device control unit 404, an NFC controller 406, an RF matching circuit 414 and an NFC antenna 416. Furthermore, the NFC controller 406 includes control unit 408, signal processor 410, and RF modem 412 (i.e., transmitter and receiver). In accordance with the present disclosure, signal processor 410 may analyze characteristics or features of response signals received in response to RF pulses transmitted to device 418, and analyze those features to determine a distance value indicative of a distance between NFC reader 402 (and, specifically, NFC antenna 416 of NFC reader 402) and a complementary antenna of device 418. Thus, in this example, signal processor 410 includes a signal analyzer of the kind set forth herein. It is noted that in other embodiments the signal analyzer and processing unit may be implemented as physically separated components of the communication device.

Device control unit 404 may be implemented as an application processor, for example. Furthermore, it is noted that the NFC antenna 416 and the RF matching circuit 414 form a resonant RLC circuit, which enables coupling the NFC antenna 416 to a complementary antenna of device 418.

As mentioned, signal processor 410 is configured to analyze response signals received from device 418 via NFC antenna 416 to determine values of one or more characteristics of the response signals. Those values are passed to control unit 408, which operates as a processor to analyze the values to determine a corresponding distance value. In embodiments, control unit 408 may perform that determining by accessing a look-up table (e.g., stored in a data storage device (i.e., memory device 407)) that stores a plurality of distance mappings that relate signal feature values to distance values. Based upon that analysis, control unit 408 generates an output that is indicative of the distance value or provides other information based upon the distance value.

Figure 5:
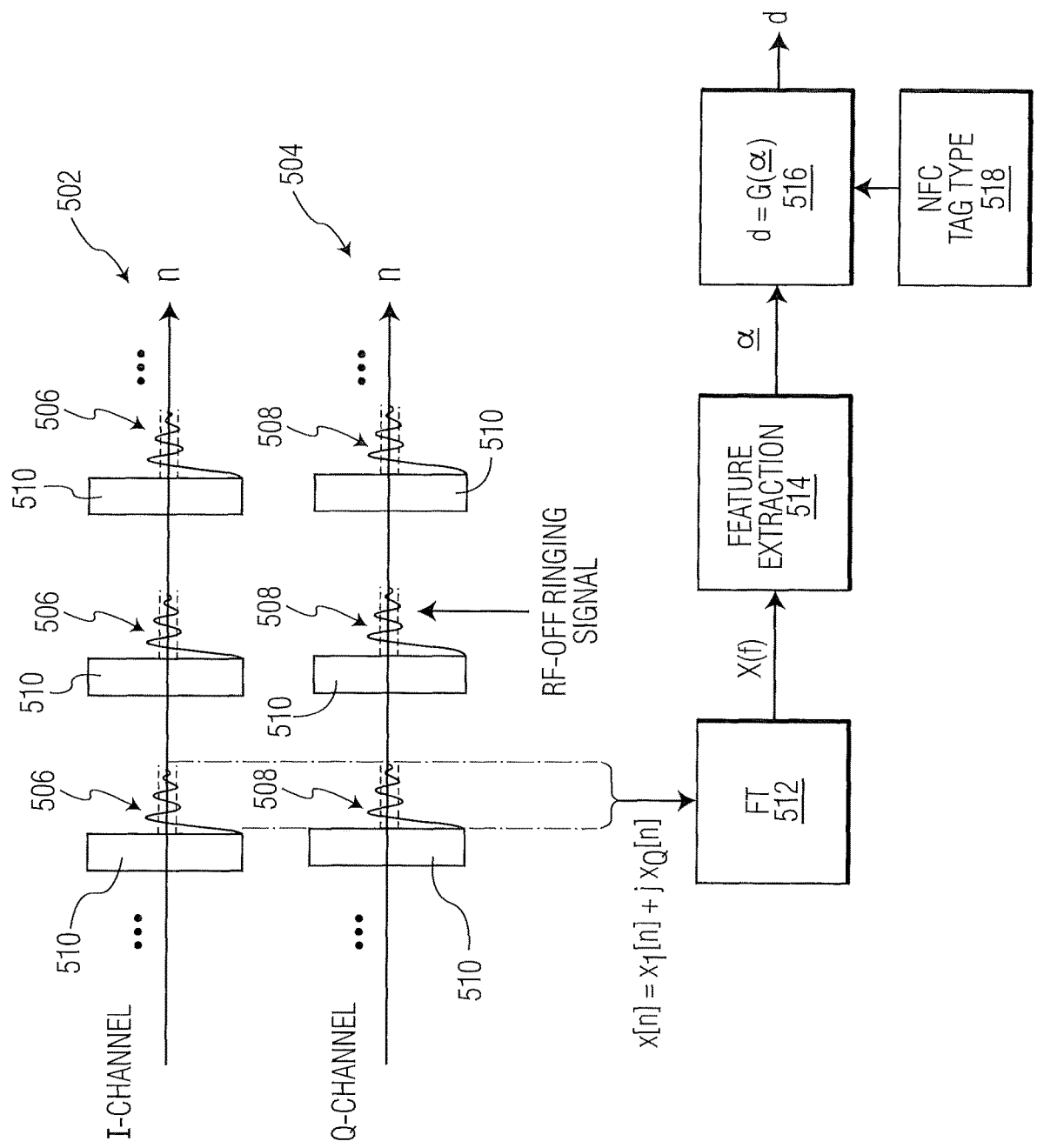
FIG. 5 is a diagram illustrating the process utilized by a signal processor to process RF-off ringing signals to determine values of features or attributes thereof and to determine a distance between an NFC reader and the NFC tag that generated the RF-off ringing signals based upon those values.

FIG. 5 is a diagram illustrating the process utilized by a signal processor (e.g., signal analyzer 204 of FIG. 2 or signal processor 410 of FIG. 4) to process RF-off ringing signals to determine values of signal features or attributes thereof and to determine a distance between an NFC reader and the NFC tag that generated the RF-off ringing signals based upon those values.

In general, the RF-off ringing signals are received at an NFC antenna (e.g., NFC antenna 416 of FIG. 4) as two separate signals that are phase shifted from one another. The first signal is referred to as the in-phase (I) signal received in an I-channel, while the second signal is referred to as the quadrature (Q) signal received in a Q-channel. In FIG. 5, the I and Q signals are depicted on time axes 502 and 504, respectively. On each axis 502, 504, the RF-off ringing signals are illustrated by waveforms 506 for I channel axis 502 and by waveforms 508 for Q channel axis 504. On each axis, the gray blocks 510 represent time periods during which the NFC reader is transmitting the RF transmitted field. The RF-off ringing signals 508 are received following the transmitted field being turned off.

To process the RF-off ringing signals, the signal processor is configured to combine the I-channel and Q-channel RF-off ringing signals received following the transmission of a transmitted signal into a complex valued single signal for processing. Specifically, where the RF-off ringing signal received on the I channel is expressed as $x_I[n]$, where n represents data samples of the ringing signals sampled over time, and the RF-off ringing signal received on the Q channel is expressed as $x_Q[n]$, where n represents data samples of the ringing signals sampled over time, the complex valued ringing signal is equal to x[n], which is determined according to the following expression:

$$x[n] = x_I[n] + jx_Q[n] \qquad (1)$$

The complex valued RF-off ringing signal can then be further processed to determine values of features of that signal enabling the determination of a distance between the NFC reader and the NFC tag, as described herein. Specifically, after receiving the complex valued RF-off ringing signal x[n], the signal processor is configured to, in block 512, calculate the discrete Fourier transform (DFT) of the RF-off ringing signals x[n] using a fast Fourier transform (FFT) algorithm. This converts the RF-off ringing signal into a frequency domain signal X(f). Other implementations may use the Goertzel algorithm to determine the frequency domain version of the received RF-off ringing signal x[n].

With the frequency-domain signal X(f) determined, the signal processor is configured to, in block 514, process X(f) to determine values of a number of features of interest of that signal.

In general, the signal features may be any that predictably relate the RF-off ringing signals x[n] and/or their spectrum signal X(f) to the distance of the NFC tag from the NFC reader. Example features of interest may include the absolute value of the signal X(f) at specific frequencies, which may correlate to specific distances values between the NFC tag and the NFC reader.

The features of interest may also include the phase-mean-phase (PMP) of the frequency domain RF-off ringing signal X(f). The PMP may be determined according to the following expression:

$$PMP = \angle \sum_f e^{j(\phi(f) - \phi_{Free-Air}(f))} \text{ for } f \in \left[-\frac{f_s}{2}, +\frac{f_s}{2}\right], \quad (2)$$

where $f_s$ is the sampling frequency of the ringing signal x[n] (e.g., in typical NFC application the sampling frequency may be 13.56 Mhz), $\phi(f)$ is the phase spectrum of the RF-off ringing signal X(f), $\phi_{Free-Air}(f)$ is the phase spectrum of the RF-ringing signal X(f) in the absence of tags or metallic objects, i.e., Free-Air condition. The operator $\angle (\bullet)$ returns the phase angle of the input in radian, therefore, the PMP unit is radian (rad).

Another signal feature that may be determined and utilized is the Phase-Circular-Variance (PCV) of the frequency domain RF-off ringing signal X(f). The PCV value may be determined according to the following expression:

$$PCV = 1 - \left|\sum_f e^{j(\phi(f) - \phi_{Free-Air}(f))}\right| / N \text{ for } \in \left[-\frac{f_s}{2}, +\frac{f_s}{2}\right], \quad (3)$$

where $f_s$ is the sampling frequency of the ringing signal x[n] (e.g., in typical NFC application the sampling frequency may be 13.56 Mhz), N is the number of DFT frequencies f, $\phi(f)$ is the phase spectrum of the RF-off ringing signal X(f), $\phi_{Free-Air}(f)$ is the phase spectrum of the RF-off ringing signal X(f) in the absence of tags or metallic objects, i.e., Free-Air condition. The PCV value is unitless.

It has been determined that the values of these signal features (e.g., the absolute value of the signal X(f) at specific frequencies, the PMP of the frequency domain RF-off ringing signal X(f), and the PCV of the frequency domain RF-off ringing signal X(f)) have a predictable relationship to the distance between the NFC reader and a corresponding NFC tag that generated the RF-off ringing signals with those characteristics. Therefore, based on experimental results for a given NFC tag (or other object that generates RF-off ringing signals), it is possible to determine a function G( ) that predictably relates the values of the features of interest to the distance of the NFC tag from the NFC reader. Given that function G( ), the values of the signal features determined in block 514 (i.e., $\underline{\alpha}$) are provided as inputs to that function in block 516 to determine the distance value d.

In an embodiment, the function G( ) can be developed via experimentation. Specifically, an NFC tag can be placed at a number of known distances away from the NFC reader. The NFC reader can then measure RF-off ringing signals generated by the NFC tag in response to the NFC reader's transmitted field being turned off and calculate values of specific features of the ringing signal to generate a mapping of feature values to the known distance value. In one approach, an NFC tag is successively placed at different distances from the NFC reader, with the NFC reader receiving the ringing signals and determining the features of interest. That information can then be stored in a look-up table (e.g., within memory device 407 of FIG. 4) enabling determined signal feature values to be mapped to distance values. An example look-up table that includes distance mapping is depicted below in Table 1.

TABLE 1

| Feature #1 (PMP) Value | Feature #2 (PCV) Value | Feature #3 (Mag @ 211 MHz) Value | Distance between NFC reader and tag |
|---|---|---|---|
| −.2 rad | 0.14 | 115 | 5 mm |
| −.01 rad | 0.1 | 250 | 10 mm |
| 0.6 rad | 0.04 | 315 | 15 mm |

With the mapping of known distance values to ringing signal feature values determined and stored (e.g., within memory device 407 of NFC reader 402 of FIG. 4), it is then possible to determine a mathematical relation between the distance and the determined signal features using various methods. In one case, using the distance to feature value mappings it is possible to construct a function G( ) that provides a best fit for the obtained data points, i.e., the known distances and corresponding feature values, using multiple regression methods (either linear or polynomial). Such regression models employ statistical techniques to find the best fit between a single dependent variable (e.g., distance) and several independent variables (e.g., the values of the various features of interest). For example, employing one such model, the distance between an NFC tag and an NCF reader may be expressed as a second-degree polynomial function of the PMP and PCV feature values. In that case, the distance value d may be expressed as follows:

$$d = G(PMP, PCV) + \in = \quad (4)$$
$$\beta_0 + \beta_1 PMP + \beta_2 PCV + \beta_3 PMP^2 + \beta_4 PCV^2 + \beta_5 PMPPCV + \in,$$

where d is the distance, $\beta_0, \ldots, \beta_5$ are the coefficients of the polynomial, and $\in$ is the error between the actual distance and the computed distance.

In another embodiment, the function G( ) (i.e., the relationship between distance the signal feature values) may be expressed in the form of a conditional function that returns the distance value d by performing logical comparisons to the input variables (i.e., the feature values). A well-known example of a conditional function is the Heaviside step function of the form:

$$H(x) := \begin{cases} 1, & x > 0 \\ 0, & x \leq 0. \end{cases} \quad (5)$$

In this form, the distance value may be described as a conditional function of the features of interest. For example, one can describe distance as a conditional function of the PMP feature and PCV value in the form:

$$d = G(PMP, PCV) = \begin{cases} d_1, & \text{if } PMP \in [PMP^1_{lower}, PMP^1_{upper}] \text{ and } PCV \in [PCV^1_{lower}, PCV^1_{upper}] \\ d_2, & \text{if } PMP \in [PMP^2_{lower}, PMP^2_{upper}] \text{ and } PCV \in [PCV^2_{lower}, PCV^2_{upper}] \\ d_3, & \text{if } PMP \in [PMP^3_{lower}, PMP^3_{upper}] \text{ and } PCV \in [PCV^3_{lower}, PCV^3_{upper}] \\ \vdots \\ d_n, & \text{if } PMP \in [PMP^n_{lower}, PMP^n_{upper}] \text{ and } PCV \in [PCV^n_{lower}, PCV^n_{upper}] \end{cases}$$

(6)

where $PMP_{lower}^n$, $PMP_{upper}^n$, $PCV_{lower}^n$, and $PCV_{upper}^n$ are the lower and upper bounds of PMP and PCV feature values for the nth comparison.

To illustrate the relationship between the ringing signal features value of frequency-domain signal magnitude, PMP, and PCV and distance, FIGS. 6A-6C depict graphs illustrating the relationship between a specific feature of the measured RF-off ringing signal and a corresponding distance value.

In each chart, the horizontal axis represents the distance between the NFC reader and NFC tag in millimeters (MM) and the vertical axis represents the magnitude of the corresponding RF-off ringing signal feature. Chart 602 of FIG. 6A depicts the relationship of the feature that is the absolute magnitude of the frequency-domain version of the signal at a frequency of 211.875 kilohertz (KHz) to distance. As depicted in FIG. 6A, other than at very low distances (e.g., less than 2 mm) the relationship between that specific signal feature and distance is largely linear, enabling the feature to be used to accurately determine the distance value for distances great than 2 mm.

Chart 604 of FIG. 6B depicts the relationship of the PMP feature value to distance. As depicted in FIG. 6B, this particular signal feature provides very high resolution at short distances (e.g., 2 mm or less) and a somewhat linear relationship for distances great than 2 mm. The PMP feature can thus be utilized in combination to determine the distance value over a relatively large range of distances.

Chart 606 of FIG. 6C depicts the relationship of the PCV feature value to distance. As depicted in FIG. 6C, the feature has a relatively linear relationship across all distances, enabling the feature to be used to accurately determine the distance value for all distances.

As such, in one example, based on the experimental data depicted in chart 606 of FIG. 6C it is possible to determine, using regression analysis, a univariate polynomial function $G_1(PCV)$ that relates the PCV feature value to distance d:

$$G_1(PCV) = [1.8975 PCV^3 - 0.5804 PCV^2 - 0.0417 PCV^1 + 0.0172] \times 10^3 \quad (7)$$

Figure 7:
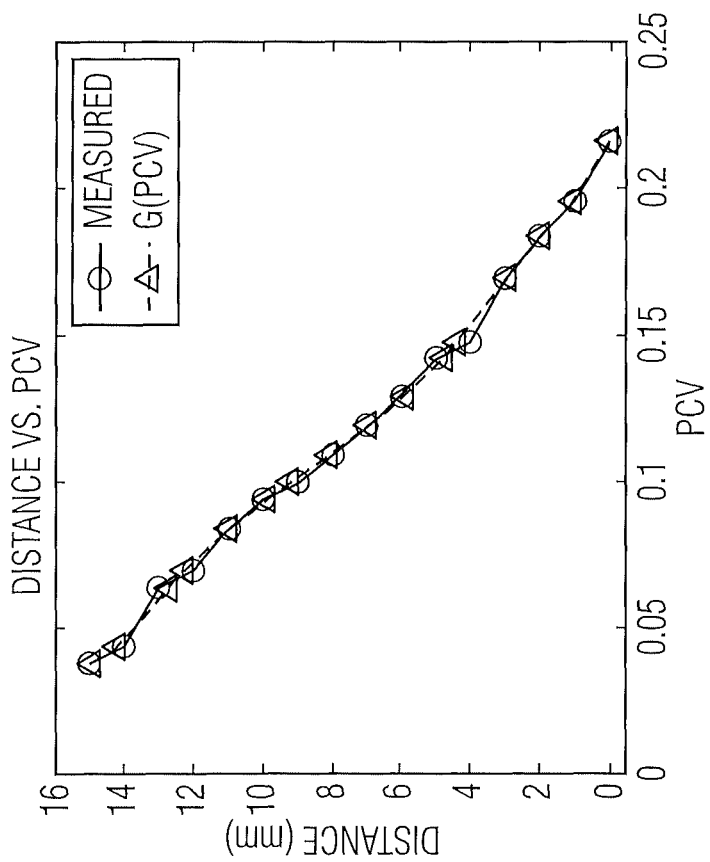
FIG. 7 is a chart depicting the actual measured data points and fitted polynomial values determined using the function $G_1(\ )$, together.

FIG. 7 is a chart depicting the actual measured data points and fitted polynomial values determined using the function $G_1(\ )$, together. The Root Mean Squared Error (RMSE) between the actual and estimated distances in this example is 0.25 mm indicating that this approach provides distance estimates with high resolution.

Similarly, it is possible to use the experimental data depicted in chart 604 of FIG. 6B to develop a univariate polynomial function $G_2(PMP)$ that relates the PMP feature value to distance d:

$$G_2(PMP) = 8.8606 PMP^3 + 30.3250 PMP^2 + 32.2746 PMP + 10.9360. \quad (8)$$

Figure 8:
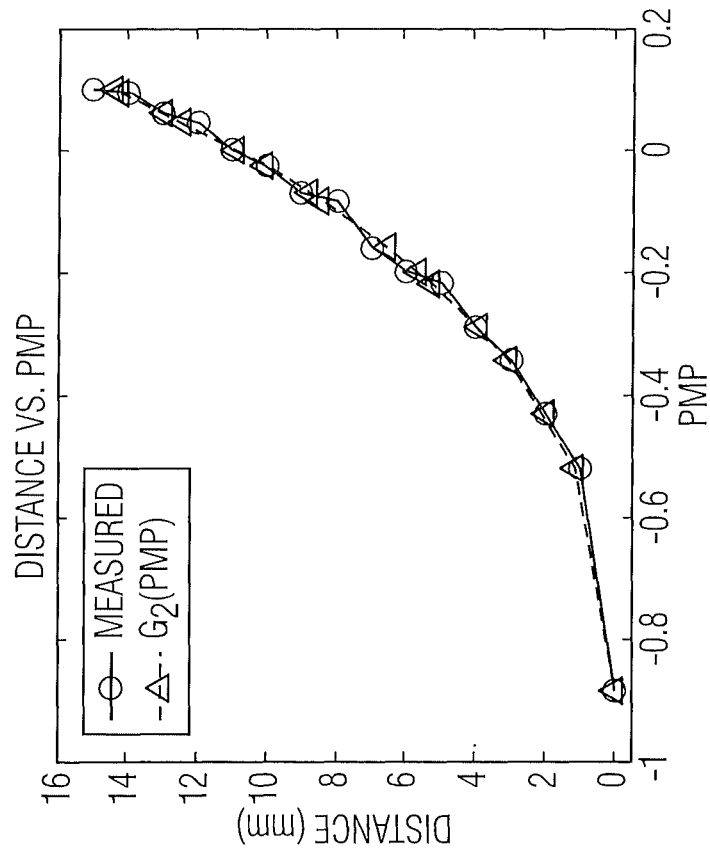
FIG. 8 is a chart depicting the actual measured data points and fitted polynomial values determined using the function $G_2(\ )$, together.

FIG. 8 is a chart depicting the actual measured data points and fitted polynomial values determined using the function $G_2(\ )$, together. The Root Mean Squared Error (RMSE) between the actual and estimated distances is 0.28 mm.

Returning to FIG. 5, in some embodiments, the function $G(\ )$ may differ based upon the specific NFC tag configuration of the NFC tag that generated the experimental data. As such, different functions $G(\ )$ may be developed for different NFC tags. In that case, the NFC reader may be configured to determine a type of NFC tag that generated the original RF-off ringing signals. The NFC. Once determined, the NFC tag type 518 may be provided as an input to block 516 and utilized by the NFC reader to determine the correct function $G(\ )$ to use to convert the features received from block 514 to a corresponding distance value.

Using these approaches, therefore, it is possible to implement a system in which an NFC reader operating in conjunction with an NFC tag may be utilized as a system configured to determine the distance between an antenna of the NFC reader from an antenna of the NFC tag. The system can then be incorporated into larger system to operate as a low-cost, wireless device configured to accurately measure distances, thicknesses, and depths of liquids or gasses.

Figure 9:
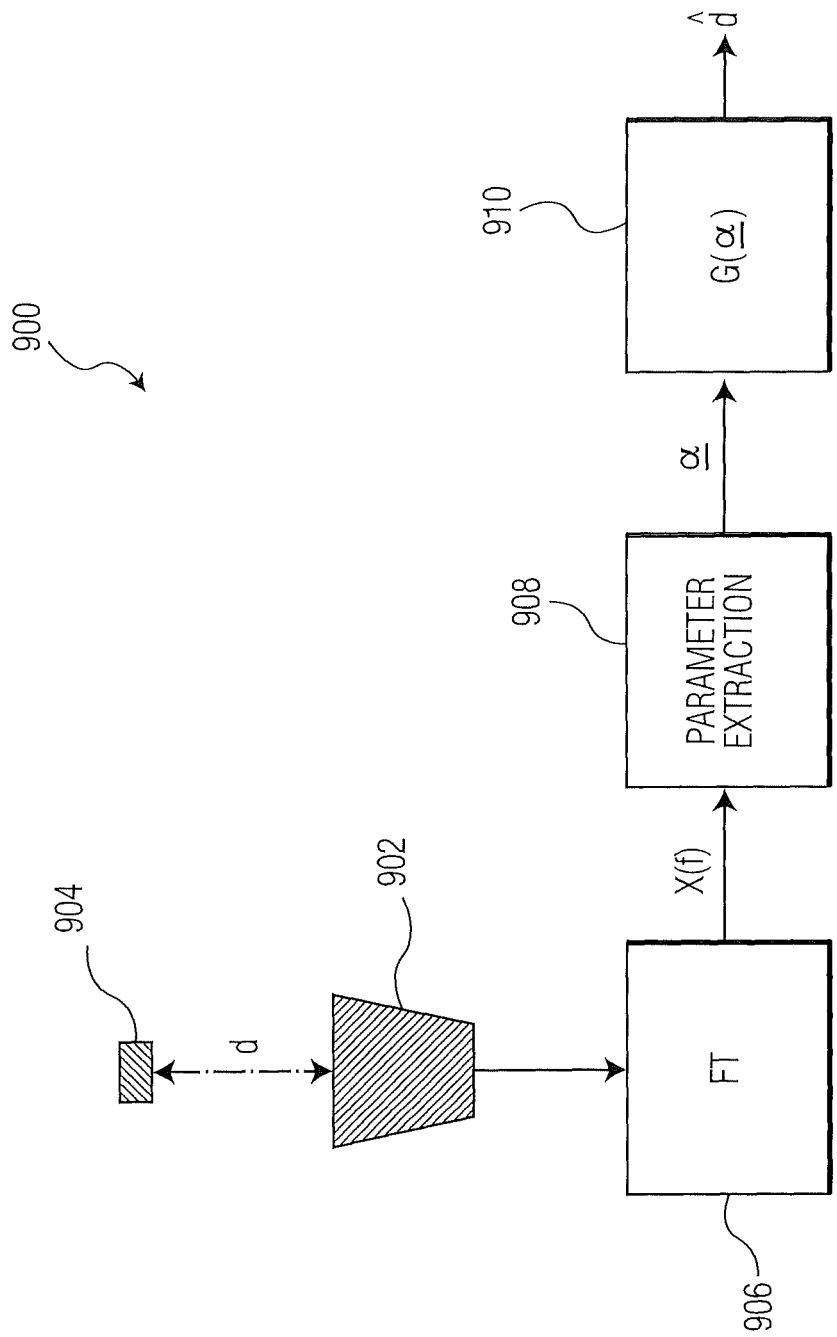
FIG. 9 depicts a system configured to determine a distance d between an antenna of an NFC reader and an NFC tag.

For example, FIG. 9 depicts a system 900 configured to determine a distance d between an antenna of NFC reader 902 and NFC tag 904. NFC reader 902 is configured to transmit an RF field and, upon termination of that field, receive and measure an RF-off ringing signal emitted by NFC tag 904. The received RF-off ringing signal (i.e., X[n]) is transmitted, in turn to a signal processor of NFC reader 902, which is configured to, in block 906, calculate the discrete Fourier transform (DFT) of the RF-off ringing signals x[n] using a fast Fourier transform (FFT) algorithm. With the frequency-domain signal X(f) determined, the signal processor is configured to, in block 906, process X(f) to determine values of a number of features of interest of that signal (e.g., a signal magnitude value, PMP, PCV, or any other features of interest).

Because the values of these features have a predictable relationship to the distance between the NFC reader and a corresponding NFC tag that generated the RF-off ringing signals with those characteristics. Therefore, based on experimental results for a given NFC tag (or other object that generates RF-off ringing signals), it is possible to determine a function G( ) that predictably relates the values of the features of interest to the distance of the NFC tag from the NFC reader. Given that function G( ), therefore, the values of the features determined in block 908 (i.e., $\underline{\alpha}$) are provided as inputs to that function in block 910 enabling NFC reader 902 to determine the distance value d.

That distance value can then be output as an appropriate signal to any other system or component (e.g., a user interface device such as a display screen) or as a transmission to another system component (e.g., a remote computer terminal) in communication with system 900.

In another embodiment, the present system may be used to provide a sensor or other device configured to measure a thickness of a material that is non-conductive (e.g., glass, plastic, etc.) through which the NFC RF transmitted signal and the RF-off ringing signal can travel.

Figure 10:
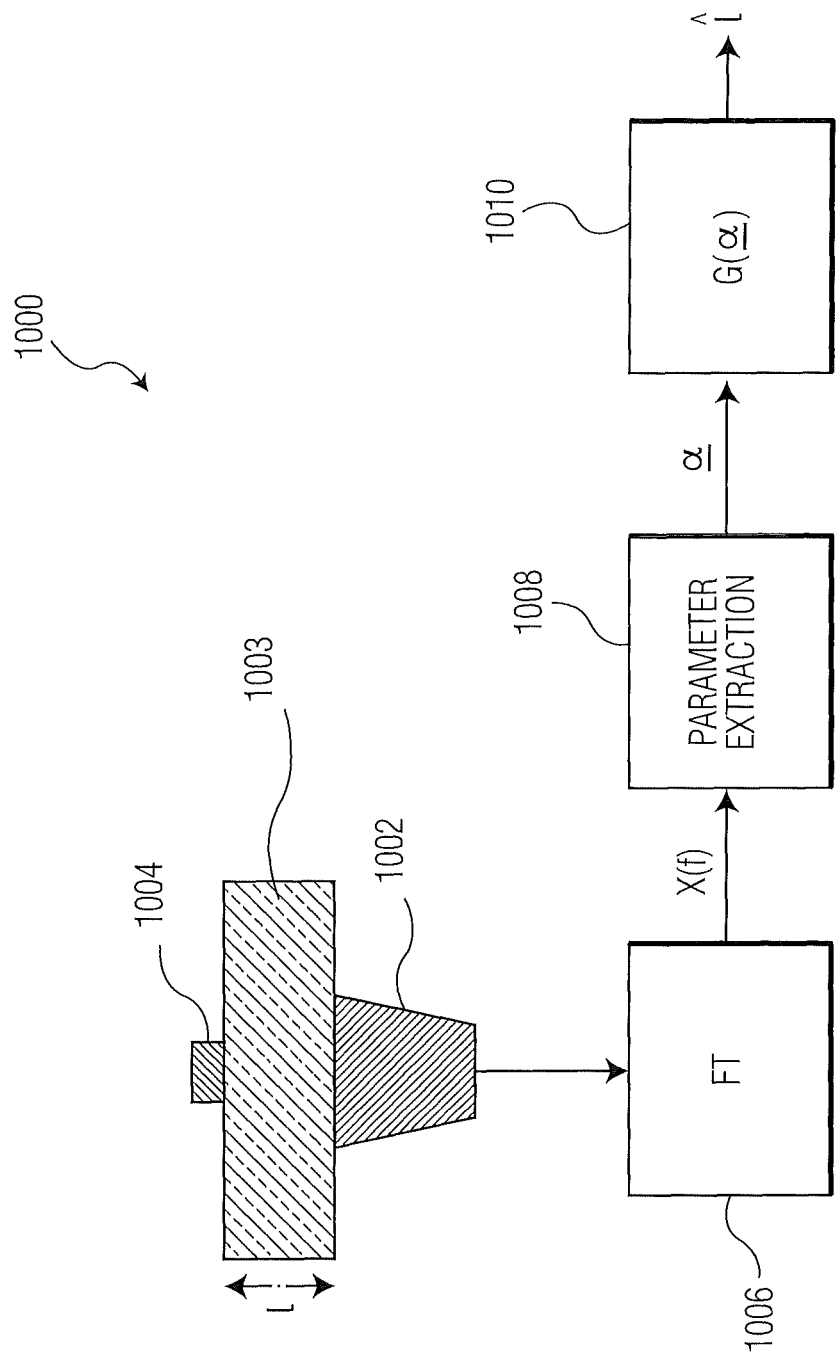
FIG. 10 depicts a system configured to determine a thickness l of a non-conductive material.

For example, FIG. 10 depicts a system 1000 configured to determine a thickness l of a non-conductive material 1003. NFC reader 1002 is configured to transmit an RF field and, upon termination of that field, receive and measure an RF-off ringing signal emitted by NFC tag 1004. The received RF-off ringing signal (i.e., X[n]) is transmitted, in turn to a signal processor of NFC reader 1002, which is configured to, in block 1006, calculate the discrete Fourier transform (DFT) of the RF-off ringing signals x[n] using a fast Fourier transform (FFT) algorithm. With the frequency-domain signal X(f) determined, the signal processor is configured to, in block 1008, process X(f) to determine values of a number of features of interest of that signal (e.g., a signal magnitude value, PMP, PCV, or any other features of interest).

Because the values of these features have a predictable relationship to the distance between the NFC reader and a corresponding NFC tag that generated the RF-off ringing signals with those characteristics. Therefore, based on experimental results for a given NFC tag (or other object that generates RF-off ringing signals), it is possible to determine a function G( ) that predictably relates the values of the features of interest to the distance of the NFC tag from the NFC reader. Given that function G( ), therefore, the values of the features determined in block 1008 (i.e., $\underline{\alpha}$) are provided as inputs to that function in block 1010 enabling NFC reader 1002 to determine the distance value d. That distance value can then be reported by NFC reader 1002 as the thickness of object 1003.

In still another embodiment, the present system may be used to measure a liquid level within a non-conductive holding tank when the NFC tag or other object configured to emit RF-off ringing signals is configured to float on a surface of the liquid.

Figure 11:
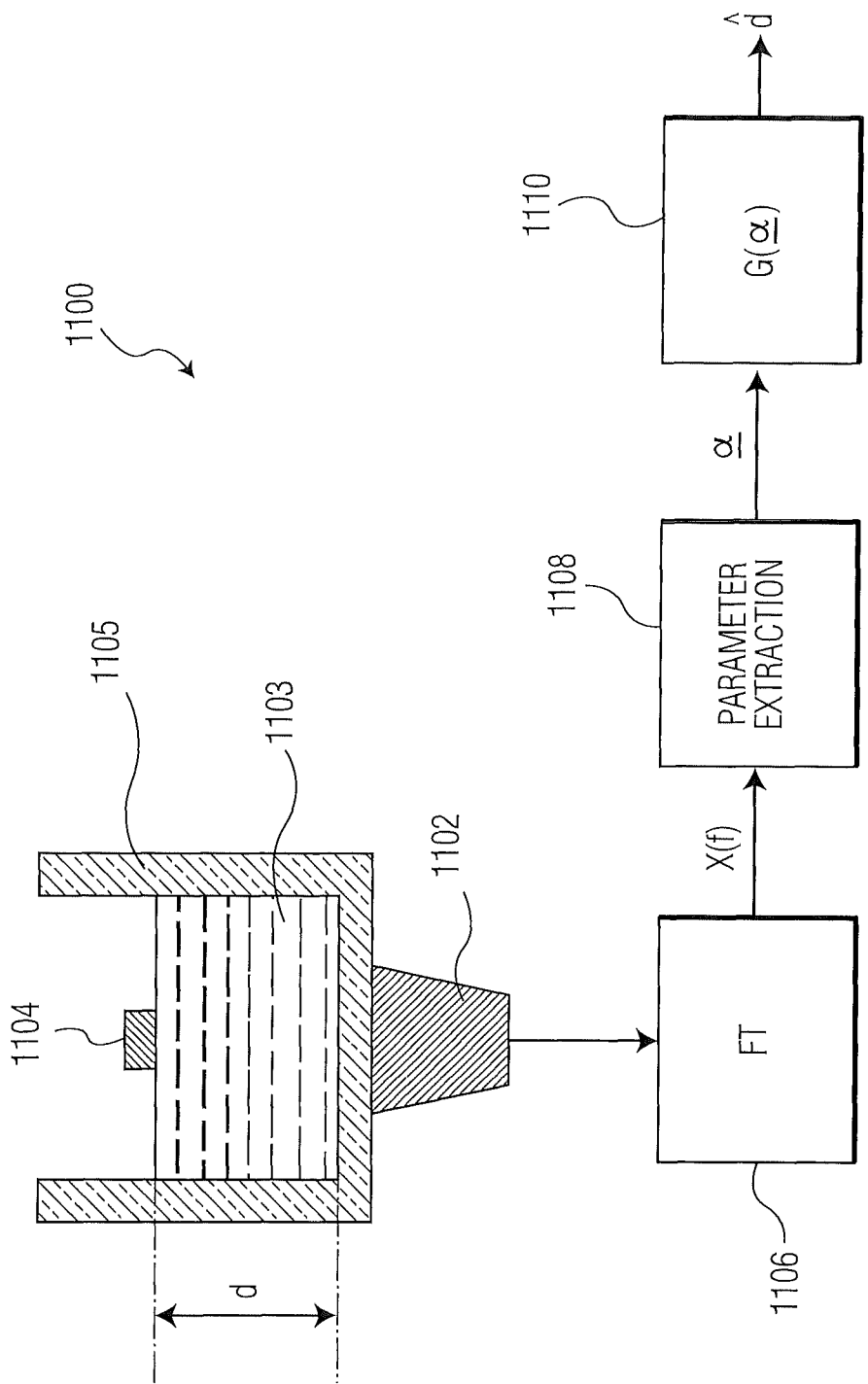
FIG. 11 depicts a system configured to determine a depth d of a fluid contained within a non-conductive holding tank.

For example, FIG. 11 depicts a system 1100 configured to determine a depth d of a fluid 1103 contained within a holding tank 1105. Within system 1100, NFC tag 1104 is configured to float upon a surface of liquid 1103. In some embodiments, NFC tag 1104 may be encapsulated in a plastic or other materials to ensure that the material of NFC tag 1104 and liquid 1103 do not chemically interact (e.g., in case liquid 1103 is corrosive or would otherwise interfere with the operation of NFC tag 1104). NFC reader 1102 is configured to transmit an RF field and, upon termination of that field, receive and measure an RF-off ringing signal emitted by NFC tag 1104. The received RF-off ringing signal (i.e., X[n]) is transmitted, in turn to a signal processor of NFC reader 1102, which is configured to, in block 1106, calculate the discrete Fourier transform (DFT) of the RF-off ringing signals x[n] using a fast Fourier transform (FFT) algorithm. With the frequency-domain signal X(f) determined, the signal processor is configured to, in block 1108, process X(f) to determine values of a number of features of interest of that signal (e.g., a signal magnitude value, PMP, PCV, or any other features of interest).

Because the values of these features have a predictable relationship to the distance between the NFC reader and a corresponding NFC tag that generated the RF-off ringing signals with those characteristics. Therefore, based on experimental results for a given NFC tag (or other object that generates RF-off ringing signals), it is possible to determine a function G( ) that predictably relates the values of the features of interest to the distance of the NFC tag from the NFC reader. Given that function G( ), therefore, the values of the features determined in block 1108 (i.e., $\underline{\alpha}$) are provided as inputs to that function in block 1110 enabling NFC reader 1102 to determine the distance value d. That distance value can then be reported by NFC reader 1102 as the depth of liquid 1103 within holding tank 1105.

In some application, it may not be necessary to measure the specific distance between an NFC reader and its corresponding NFC tag. Instead, it may only be necessary to know when the NFC tag (and an object associated with the NFC tag) is within a specific range.

Figure 12:
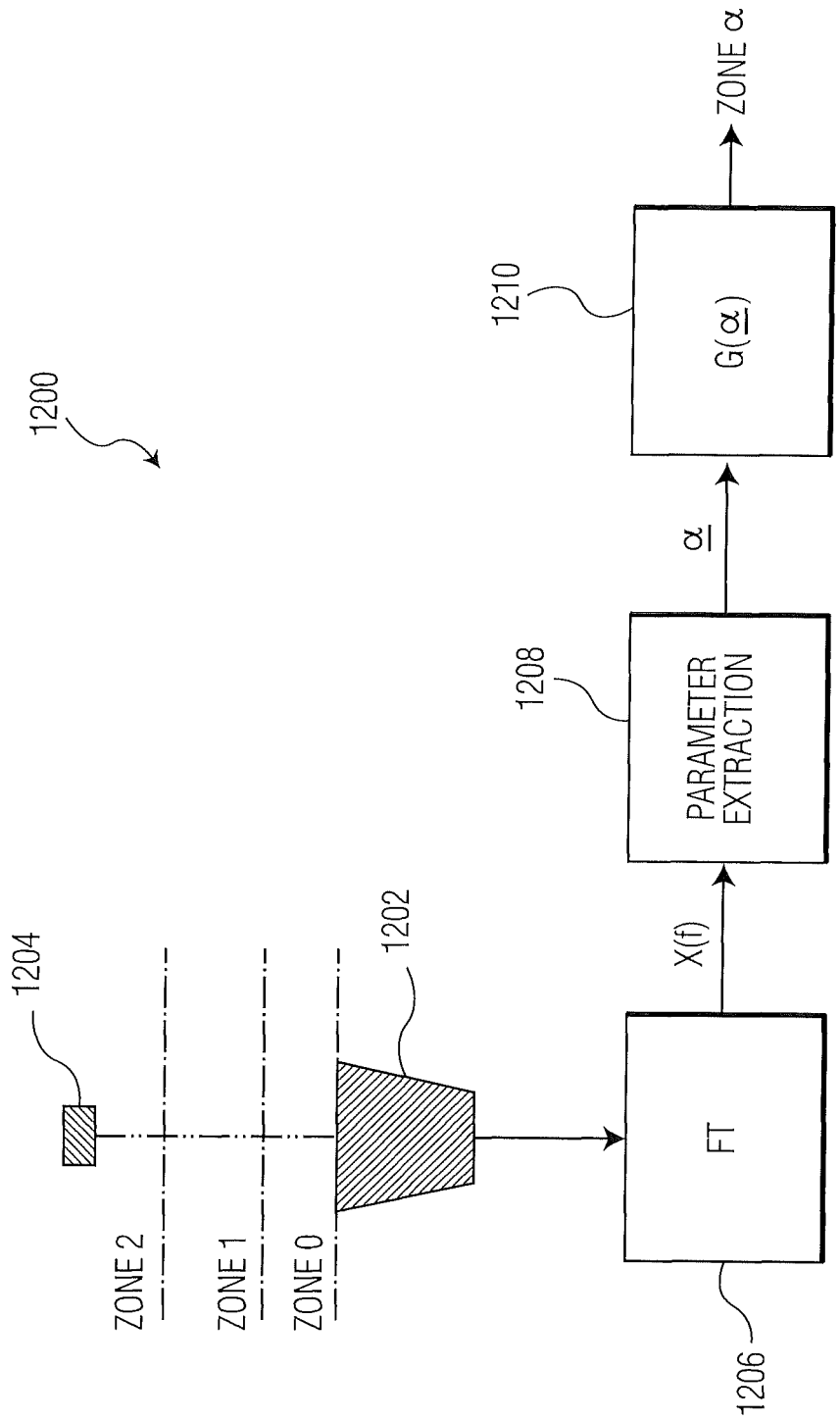
FIG. 12 depicts a system configured to determine that an NFC tag is within a particular distance range from an NFC reader.

For example, FIG. 12 depicts a system 1200 configured to determine that an NFC tag is within a particular distance range from NFC reader 1202. NFC reader 1202 is configured to transmit an RF field and, upon termination of that field, receive and measure an RF-off ringing signal emitted by NFC tag 1204. The received RF-off ringing signal (i.e., X[n]) is transmitted, in turn to a signal processor of NFC reader 1202, which is configured to, in block 1206, calculate the discrete Fourier transform (DFT) of the RF-off ringing signals x[n] using a fast Fourier transform (FFT) algorithm. With the frequency-domain signal X(f) determined, the signal processor is configured to, in block 1208, process X(f) to determine values of a number of features of interest of that signal (e.g., a signal magnitude value, PMP, PCV, or any other features of interest).

Because the values of these features have a predictable relationship to the distance between the NFC reader and a corresponding NFC tag that generated the RF-off ringing signals with those characteristics. Therefore, based on experimental results for a given NFC tag (or other object that generates RF-off ringing signals), it is possible to determine a function G( ) that predictably relates the values of the features of interest to the distance of the NFC tag from the NFC reader. Given that function G( ), therefore, the values of the features determined in block 1208 (i.e., $\underline{\alpha}$) are provided as inputs to that function in block 1210 enabling NFC reader 1202 to determine the distance value d. NFC reader 1202 is then configured to compare that distance value to determine which distance zone (e.g., zone 0, zone 1, or zone 2) NFC tag 1204 falls into. NFC reader 1202 can then generate an appropriate output based on the zone in which NFC tag 1204 is determined to be located.

Figure 13:
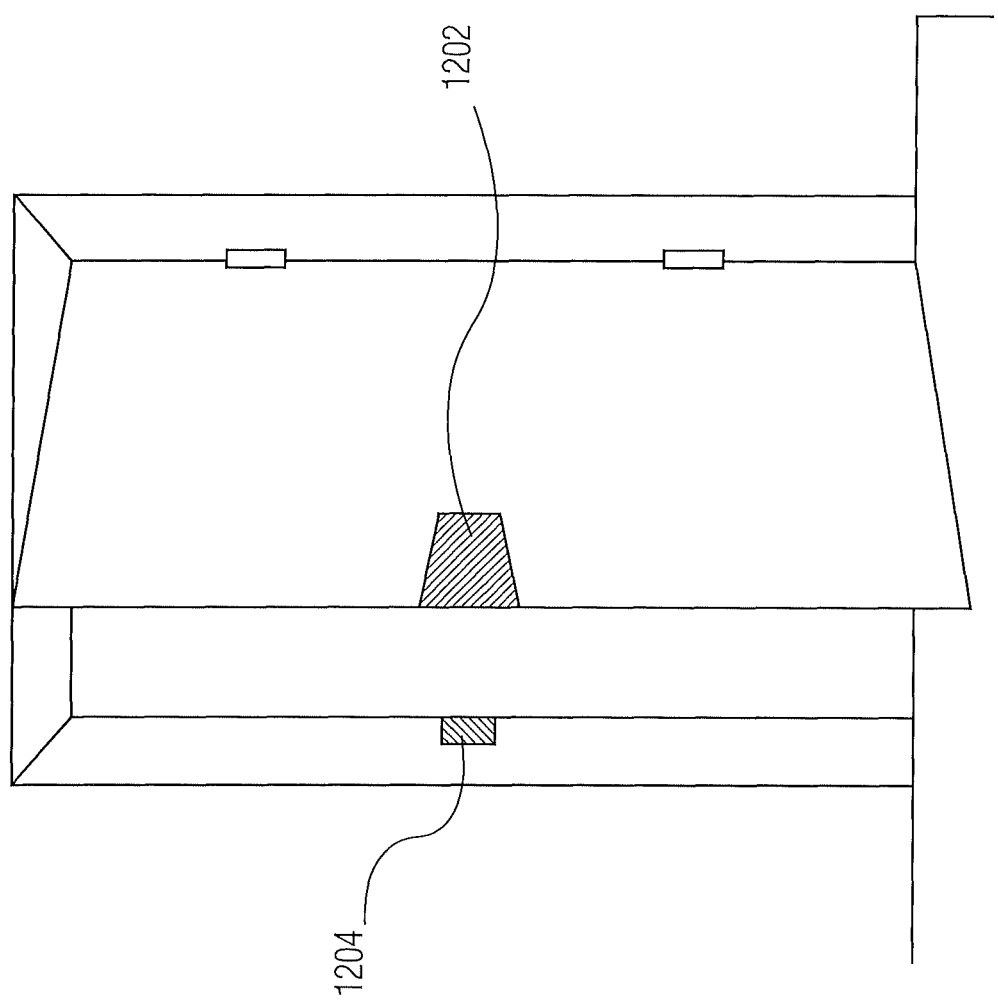
FIG. 13 depicts an example implementation of the system of FIG. 12 to determine whether a door is in an open or closed status.

In an embodiment, system 1200 may be utilized, for example, to implement a system to monitor the status of an object that is configured to move between predetermined positions and to generate outputs when the object has move from one such predetermined position to another. FIG. 13 depicts an example in which system 1200 of FIG. 12 is implemented within a door frame to determine whether the door is in an open or closed status. Specifically, NFC reader 1202 is mounted to the door, while NFC tag 1204 is mounted to the door frame. When the determined distance d exceeds a predetermined threshold, NFC reader 1202 may determine that the door is open. NFC reader 1202 can then generate an appropriate output, such as via an appropriate user interface or via communication to a remote computer system, to provide a notification that the door is in an open condition.

Conversely, when NFC reader 1202 determines that the distance d between NFC reader 1202 and NFC tag 1204 is below a threshold value, NFC reader 1202 can determine that the door is closed, and a corresponding output message can be generated.

In some aspects, the techniques described herein relate to a system, including: a data storage device configured to store a first look-up table that contains a plurality of distance mappings, where each distance mapping associates a value of a first signal feature with a distance value; and a near-field communications (NFC) reader configured to communicate with an NFC tag, the NFC reader including: an antenna, a transmitter electrically connected to the antenna, the transmitter being configured to use the antenna to transmit a radio frequency transmitted field, a receiver electrically connected to the antenna, the receiver being configured to receive from the antenna one or more response signals in response to the radio frequency transmitted field transmitted by the transmitter, and a signal processor configured to: process the one or more response signals to determine a first value of the first signal feature of the one or more response signals, access the first look-up table to determine a first distance mapping that associates the value of the first signal feature with a first distance, and generate an output signal based upon the first distance.

In some aspects, the techniques described herein relate to a system, including: an antenna; a transmitter electrically connected to the antenna, the transmitter being configured to use the antenna to transmit a radio frequency transmitted field; a receiver electrically connected to the antenna, the receiver being configured to use the antenna to receive a response signal in response to transmission of the radio frequency transmitted field, wherein the response signal includes a radio frequency-off ringing signal emitted from an object in proximity to the transmitter; and a signal processor configured to: process the response signal to determine a first value of a first signal feature of the response signals, and determine, using the first value of the first signal feature, a distance between the antenna and the object.

In some aspects, the techniques described herein relate to a method, including: receiving, from an antenna of a near-field communications (NFC) reader one or more response signals in response to a radio frequency transmitted field transmitted by a transmitter of the NFC reader; processing the one or more response signals to determine a first value of a first signal feature of the one or more response signals; accessing a look-up table to determine a first distance mapping stored in the look-up table that associates the value of the first signal feature with a first distance; and generating an output signal based upon the first distance.

The preceding detailed description is merely illustrative in nature and is not intended to limit the embodiments of the subject matter or the application and uses of such embodiments.

As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system, comprising:
   a data storage device configured to store a first look-up table that contains a plurality of distance mappings, where each distance mapping associates a value of a first signal feature with a distance value, wherein the first signal feature includes at least one of a phase-mean-phase (PMP) of the one or more response signals and a phase-circular-variance (PCV) of the one or more response signals; and
   a near-field communications (NFC) reader configured to communicate with an NFC tag, the NFC reader including:
   an antenna,
   a transmitter electrically connected to the antenna, the transmitter being configured to use the antenna to transmit a radio frequency transmitted field,
   a receiver electrically connected to the antenna, the receiver being configured to receive from the antenna one or more response signals in response to the radio frequency transmitted field transmitted by the transmitter, and a signal processor configured to:
process the one or more response signals to determine a first value of the first signal feature of the one or more response signals,
access the first look-up table to determine a first distance mapping that associates the value of the first signal feature with a first distance, and
generate an output signal based upon the first distance.

2. The system of claim 1, wherein the signal processor is configured to process the one or more response signals to determine the value of the first signal feature by calculating a Fourier transform of the one or more response signals.

3. The system of claim 1, wherein the signal processor is configured to process the one or more response signals to determine a second value of a second signal feature of the one or more response signals.

4. The system of claim 3, wherein each distance mapping in the first look-up table is associated with the second value of the second signal feature and the signal processor is configured to access the first look-up table to determine the first distance mapping that associates the first value of the first signal feature and the second value of the second signal feature with the first distance.

5. The system of claim 1, wherein the first distance is indicative of a distance between the transmitter of the NFC reader and the NFC tag.

6. The system of claim 1, wherein the first look-up table is associated with a first NFC tag configuration and wherein the data storage device is configured to store a second look-up table that contains a second plurality of distance mappings, wherein the second look-up table is associated with a second NFC tag configuration.

7. The system of claim 6, wherein signal processor is further configured to:
determine a configuration the NFC tag; and
determine that the configuration of the NFC tag is the first NFC tag configuration.

8. A system, comprising:
an antenna;
a transmitter electrically connected to the antenna, the transmitter being configured to use the antenna to transmit a radio frequency transmitted field;
a receiver electrically connected to the antenna, the receiver being configured to use the antenna to receive a response signal in response to transmission of the radio frequency transmitted field, wherein the response signal includes a radio frequency-off ringing signal emitted from an object in proximity to the transmitter; and
a signal processor configured to:
process the response signal to determine a first value of a first signal feature of the response signals, wherein the first signal feature includes at least one of a phase-mean-phase (PMP) of the response signal and a phase-circular-variance (PCV) of the response signal, and
determine, using the first value of the first signal feature, a distance between the antenna and the object.

9. The system of claim 8, wherein the object is a near-field communication (NFC) tag.

10. The system of claim 8, wherein the signal processor is configured to process the response signals to determine the first value of the first signal feature by determine a frequency domain version of the response signal.

11. The system of claim 8, wherein the signal processor is configured to:
process the response signal to determine a second value of a second signal feature of response signal; and
determine the distance between the antenna and the object using the second value of the second signal feature.

12. The system of claim 8, wherein the system is configured to be incorporated into a door frame of a door and, when the object is mounted to a door connected to the door frame, the signal processor is configured to generate an output message indicative that the door is in a closed condition when the distance between the antenna and the object is less than a predetermined threshold value.

13. The system of claim 8, wherein the system is configured to be incorporated into a base of a container configured to hold a liquid and, when the object is configured to float on a surface of the liquid, the signal processor is configured to generate an output message indicative of a depth of the liquid based upon the distance between the antenna and the object.

14. A method, comprising:
receiving, from an antenna of a near-field communications (NFC) reader one or more response signals in response to a radio frequency transmitted field transmitted by a transmitter of the NFC reader;
processing the one or more response signals to determine a first value of a first signal feature of the one or more response signals;
determining that the first signal feature is at least one of a phase-mean-phase (PMP) of the one or more response signals and a phase-circular-variance (PCV) of the one or more response signals;
accessing a look-up table to determine a first distance mapping stored in the look-up table that associates the value of the first signal feature with a first distance; and
generating an output signal based upon the first distance.

15. The method of claim 14, further comprising processing the one or more response signals to determine the value of the first signal feature by calculating a Fourier transform of the one or more response signals.

16. The method of claim 15, further comprising processing the one or more response signals to determine a second value of a second signal feature of the one or more response signals.

17. The method of claim 14, wherein the one or more response signals are generated by an NFC tag and the look-up table is associated with a first NFC tag configuration and further comprising:
determining that the NFC tag is configured in the first NFC tag configuration.

* * * * *